United States Patent
Harrington et al.

(10) Patent No.: US 10,501,201 B2
(45) Date of Patent: Dec. 10, 2019

(54) AERODYNAMIC CONTROL SURFACE MOVEMENT MONITORING SYSTEM FOR AIRCRAFT

(71) Applicant: Hamilton Sundstrand Corporation, Charlotte, NC (US)

(72) Inventors: Erik Harrington, Machesney Park, IL (US); Christian Miller, Beloit, WI (US); Yuniya S. Bishop, Dixon, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 296 days.

(21) Appl. No.: 15/469,740

(22) Filed: Mar. 27, 2017

(65) Prior Publication Data
US 2018/0273199 A1 Sep. 27, 2018

(51) Int. Cl.
*B64D 45/00* (2006.01)
*B64C 9/16* (2006.01)
*B64C 9/22* (2006.01)
*B64C 13/28* (2006.01)

(52) U.S. Cl.
CPC ............ *B64D 45/0005* (2013.01); *B64C 9/16* (2013.01); *B64C 9/22* (2013.01); *B64C 13/28* (2013.01); *B64D 45/00* (2013.01); *Y02T 50/44* (2013.01)

(58) Field of Classification Search
CPC .......... B64C 13/16; B64C 13/00; B64C 9/14; B64C 9/02; B64C 13/28; B64C 2009/005; G01S 17/08; Y02T 50/44
See application file for complete search history.

(56) References Cited

U.S. PATENT DOCUMENTS 4,471,304 A 9/1984 Wolf
4,598,888 A * 7/1986 Beteille .................. B64C 39/12
                                                    244/178

(Continued)

FOREIGN PATENT DOCUMENTS

EP 3208189 A1 8/2017

OTHER PUBLICATIONS

"Installation and User's Guide: Linear Shaft Motor", 2008.*

(Continued)

*Primary Examiner* — Assres H Woldemaryam
(74) *Attorney, Agent, or Firm* — Cantor Colburn LLP (57) ABSTRACT

Actuator systems and methods for controlling aerodynamic control surfaces of aircraft including a first actuator receiving a first input and a first linear translation element that moves based thereon, the first linear translation element operably connected to a first portion of the control surface. A first sensor assembly is disposed relative to the first actuator that generates an output based on a displacement of the first translation element. A second actuator receives a second input and a second linear translation element moves based on the second input, the second linear translation element operably connected to a second portion of the control surface. A second sensor assembly is disposed relative to the second actuator that generates a second sensor output based on a displacement of the second translation element. A controller generates the inputs and receives the sensor outputs to determine if an error condition exists for the system.

18 Claims, 5 Drawing Sheets

(56) References Cited

U.S. PATENT DOCUMENTS

| | | | | |
|---|---|---|---|---|
| 4,947,077 | A | * | 8/1990 | Murata .............. H02N 2/0025 |
| | | | | 310/317 |
| 6,639,759 | B2 | | 10/2003 | Inoguchi et al. |
| 6,819,208 | B1 | | 11/2004 | Peghaire et al. |
| 7,259,551 | B2 | | 8/2007 | Mock et al. |
| 7,511,476 | B2 | | 3/2009 | Taylor et al. |
| 8,427,139 | B2 | | 4/2013 | Malik et al. |
| 8,531,181 | B2 | | 9/2013 | Aebi et al. |
| 9,605,736 | B1 | * | 3/2017 | Foshage ............. F16H 25/2252 |
| 9,682,769 | B2 | * | 6/2017 | Richter .............. B64C 13/30 |
| 2004/0036887 | A1 | * | 2/2004 | Kitahara ............. G01S 17/32 |
| | | | | 356/486 |
| 2011/0062282 | A1 | * | 3/2011 | Richter .............. B64C 13/42 |
| | | | | 244/99.4 |
| 2013/0192453 | A1 | | 8/2013 | Bonny |
| 2014/0138481 | A1 | | 5/2014 | Sakota |
| 2015/0197347 | A1 | * | 7/2015 | Moy ................ B64D 45/00 |
| | | | | 701/33.9 |
| 2015/0279539 | A1 | * | 10/2015 | Blanding ............ H01F 7/123 |
| | | | | 335/228 |
| 2015/0336683 | A1 | * | 11/2015 | Neb ................. B64C 9/00 |
| | | | | 701/4 |
| 2016/0169310 | A1 | | 6/2016 | Erickson et al. |
| 2016/0195115 | A1 | * | 7/2016 | Fenn ................. B64C 25/30 |
| | | | | 92/82 |
| 2016/0355253 | A1 | * | 12/2016 | Nfonguem ........... F16D 37/008 |
| 2017/0088251 | A1 | * | 3/2017 | Nfonguem ........... B64C 13/28 |
| 2017/0233095 | A1 | * | 8/2017 | Baines .............. B64C 9/02 |
| | | | | 244/99.3 |

OTHER PUBLICATIONS

"Linear Shaft Motor", 2010.*

European Search Report, European Application No. 18163750.5, dated Jul. 6, 2018, European Patent Office; European Search Report 16 pages.

Langnau, Leslie "The number of choices for converting electrical energy into linear motion recently increased. Welcome the linear motor", Apr. 1, 2000, XP055488873, Retrieved from the Internet, URL: http://www.machinedesign.com/linear-motion/better-motion-control-new-linear-motors [retrieved Jun. 28, 2018] 5 pages.

Pulse Nippon: "Linear Shaft Motor the Next Generation Ultra-Precision Brushless Linear Motor Simple-High-Precision-Non-Contact", Mar. 1, 2016, XP055488894, Retrieved from the Internet, URL: https://www.nipponpulse.com/catalog/document/57337c84c78c8_1sm_install_guide_revj.pdf [retrieved Jun. 28, 2018] 104 pages.

EP Office Action for Application No. 18163750.5; dated Aug. 8, 2019; 8 Pages.

* cited by examiner

AERODYNAMIC CONTROL SURFACE MOVEMENT MONITORING SYSTEM FOR AIRCRAFT

BACKGROUND

Modern aircraft often use a variety of high lift leading and trailing edge devices to improve high angle of attack performance during various phases of flight, for example, takeoff and landing. One such device is a trailing edge flap. Current trailing edge flaps generally have a stowed position in which the flap forms a portion of a trailing edge of a wing, and one or more deployed positions in which the flap extends forward and down to increase the camber and/or plan form area of the wing. The stowed position is generally associated with low drag at low angles of attack and can be suitable for cruise and other low angle of attack operations. The extended position(s) is/are generally associated with improved air flow characteristics over the aircraft's wing at higher angles of attack.

Proper extension and retraction of such flaps is important for control of the aircraft during different maneuvers. As such, it is conventional to include multiple feedback systems to monitor flap deployment and retraction. For example, sensor systems may monitor absolute flap position, flap skew position and detection of a jam or disconnected actuator.

In general, such systems can include a control unit that causes a main drive unit to produce rotation of a shaft. This rotation can then be converted to flap extension in known manners such as by use of a ball screw. In such systems, each flap typically includes two actuators, one for each side of the flap. If the two actuators do not extend two sides of the flap the same amount, the flap experiences skew. Further, in some cases, the actuator may not be working effectively and determination of such, as well as skew, may be beneficial.

SUMMARY

According to some embodiments, actuator systems for controlling aerodynamic control surfaces of an aircraft are provided. The systems include a first actuator receiving a first actuator input and a first linear translation element that moves based on the first actuator input, the first linear translation element operably connected to a first portion of the aerodynamic control surface to move the first portion of the aerodynamic control surface, a first sensor assembly disposed relative to the first actuator that generates a first sensor output based on a displacement of the first linear translation element, a second actuator receiving a second actuator input and a second linear translation element that moves based on the second actuator input, the second linear translation element operably connected to a second portion of the aerodynamic control surface to move the second portion of the aerodynamic control surface, a second sensor assembly disposed relative to the second actuator that generates a second sensor output based on a displacement of the second linear translation element, and a controller that generates the first and second actuator inputs and receives the first and second sensor outputs and determines if an error condition exists for the system based on the first and second sensor outputs.

In addition to one or more of the features described above, or as an alternative, further embodiments of the actuator systems may include that the first and second actuators are electromagnetic actuators.

In addition to one or more of the features described above, or as an alternative, further embodiments of the actuator systems may include that the aerodynamic control surface is a flap or slat.

In addition to one or more of the features described above, or as an alternative, further embodiments of the actuator systems may include that the error condition is a skew condition of the aerodynamic control surface and is determined by the controller when the sensors outputs from the first and second sensor assemblies do not match.

In addition to one or more of the features described above, or as an alternative, further embodiments of the actuator systems may include a drive unit operably connected to the controller configured to drive a drive shaft that is operably connected to the first and second actuators, the drive unit causing the drive shaft to rotate based on signals received from the controller.

In addition to one or more of the features described above, or as an alternative, further embodiments of the actuator systems may include that the error condition is an actuator malfunction and is determined by the controller when at least one of the first actuator input and the second actuator input does not match a respective first or second sensor output.

In addition to one or more of the features described above, or as an alternative, further embodiments of the actuator systems may include that the first linear translation element is a magnetic shaft formed from alternating magnetic elements that is driven by an electromagnetic stator.

In addition to one or more of the features described above, or as an alternative, further embodiments of the actuator systems may include that the first sensor assembly comprises a first magnetic sensor and a second magnetic sensor, wherein the first and second magnetic sensors are positioned relative to the first linear translation element to detect the alternating magnetic elements of the first linear translation element.

In addition to one or more of the features described above, or as an alternative, further embodiments of the actuator systems may include that the first and second magnetic sensors are positioned with an axial offset relative to the first linear translation element.

In addition to one or more of the features described above, or as an alternative, further embodiments of the actuator systems may include that the magnetic sensors are Hall Effect sensors.

In addition to one or more of the features described above, or as an alternative, further embodiments of the actuator systems may include that the first linear translation element is a threaded ball screw shaft that is driven by a ball nut.

In addition to one or more of the features described above, or as an alternative, further embodiments of the actuator systems may include that the first sensor assembly comprises a first optical sensor and a second optical sensor, wherein the first and second optical sensors are positioned relative to the first linear translation element to detect the threads of the first linear translation element.

In addition to one or more of the features described above, or as an alternative, further embodiments of the actuator systems may include that the first and second optical sensors are positioned with a circumferential offset relative to the first linear translation element.

In addition to one or more of the features described above, or as an alternative, further embodiments of the actuator systems may include that the first sensor assembly comprises at least two sensing elements positioned relative to the linear translation element and configured to detect a position or movement of the linear translation element.

According to some embodiments, methods of controlling and monitoring aerodynamic control surfaces of an aircraft are provided. The methods include sending an first actuator input from a controller to a first actuator to drive a movement of a first linear translation element that is operably connected to a first portion of the aerodynamic control surface, sending an second actuator input from the controller to a second actuator to drive a movement of a second linear translation element that is operably connected to a second portion of the aerodynamic control surface, generating a first sensor output with a first sensor assembly disposed relative to the first actuator, the first sensor output being based an amount of linear motion of the first linear translation element, generating a second sensor output with a second sensor assembly disposed relative to the second actuator, the second sensor output being based an amount of linear motion of the second linear translation element, comparing expected sensor outputs to the first and second sensor outputs using the controller to determine if an error condition exists, and generating an error indication when the error condition exists.

In addition to one or more of the features described above, or as an alternative, further embodiments of the methods may include that the first and second actuators are electromagnetic actuators, the method further comprising detecting variations in magnetic field that correlate to linear motion of the first and second linear translation elements.

In addition to one or more of the features described above, or as an alternative, further embodiments of the methods may include that the error condition is at least one of (i) a skew condition of the aerodynamic control surface and is determined by the controller when the sensors outputs from the first and second sensor assemblies do not match or (ii) an actuator malfunction and is determined by the controller when at least one of the first actuator input and the second actuator input does not match a respective first or second sensor output.

In addition to one or more of the features described above, or as an alternative, further embodiments of the methods may include that the first linear translation element is a magnetic shaft formed from alternating magnetic elements that is driven by an electromagnetic stator, the method further comprising further comprising detecting variations in magnetic field that correlate to linear motion of the first and second linear translation elements.

In addition to one or more of the features described above, or as an alternative, further embodiments of the methods may include that the first sensor assembly comprises a first magnetic sensor and a second magnetic sensor, wherein the first and second magnetic sensors are at least one of (i) positioned relative to the first linear translation element to detect the alternating magnetic elements of the first linear translation element or (ii) positioned with an axial offset relative to the first linear translation element.

In addition to one or more of the features described above, or as an alternative, further embodiments of the methods may include detecting a characteristic of the first and second linear translation elements and correlating the detected characteristics to linear motion of the respective first and second linear translation elements.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Disclosed herein are aerodynamic control surface movement monitoring systems (also referred to as an actuator monitoring systems herein) that provide feedback for an aircraft flap, slat, or other movable aerodynamic control surface. The disclosed systems provide a solution for: positional location (i.e. feedback of the control surface position); skew position feedback of the control surface; and failure detection for a jam or failure of a portion of an actuation system configured to move the aerodynamic control surface. The systems disclosed, by combining multiple functions, allow part count reduction, weight reduction, and reliability improvement compared to conventional systems.

In one embodiment, a sensor assembly is disposed in or relative to one or more of actuators that are controlled to move an aerodynamic control surface of an aircraft. The sensor assembly can detect a movement or position of a linear translation element of the actuator to measure movement and/or position of the aerodynamic control surface. The sensor assembly can include sensors that are selected based on a configuration of the linear translation element. For example, in some embodiments, a magnetic shaft is selected for the linear translation element and the sensor assembly includes magnetic sensors, such as Hall Effect sensors. In other embodiments, the linear translation element can be a ball screw, and optical or other position/distance sensors can be used to monitor the movement/position of the linear translation element. As the actuator delivers mechanical motion to the aerodynamic control surface, the sensor assembly provides a sensor output signal based on detected movement of the linear translation element and, consequently, movement of the aerodynamic control surface. Detection of a jam or disconnected actuator is established when sensor output is not proportional to actuator input or a mismatch is detected between two different sensor outputs. As will be understood, the input can be determined by a control system that drives an input shaft or electromagnetic actuators as more fully described below.

The systems described herein can include two or more of the actuator/sensor combinations for each aerodynamic control surface. In some embodiments, a measurement of travel distance of a linear translation element of an actuator is used to measure control surface position and/or skew.

Figure 1:
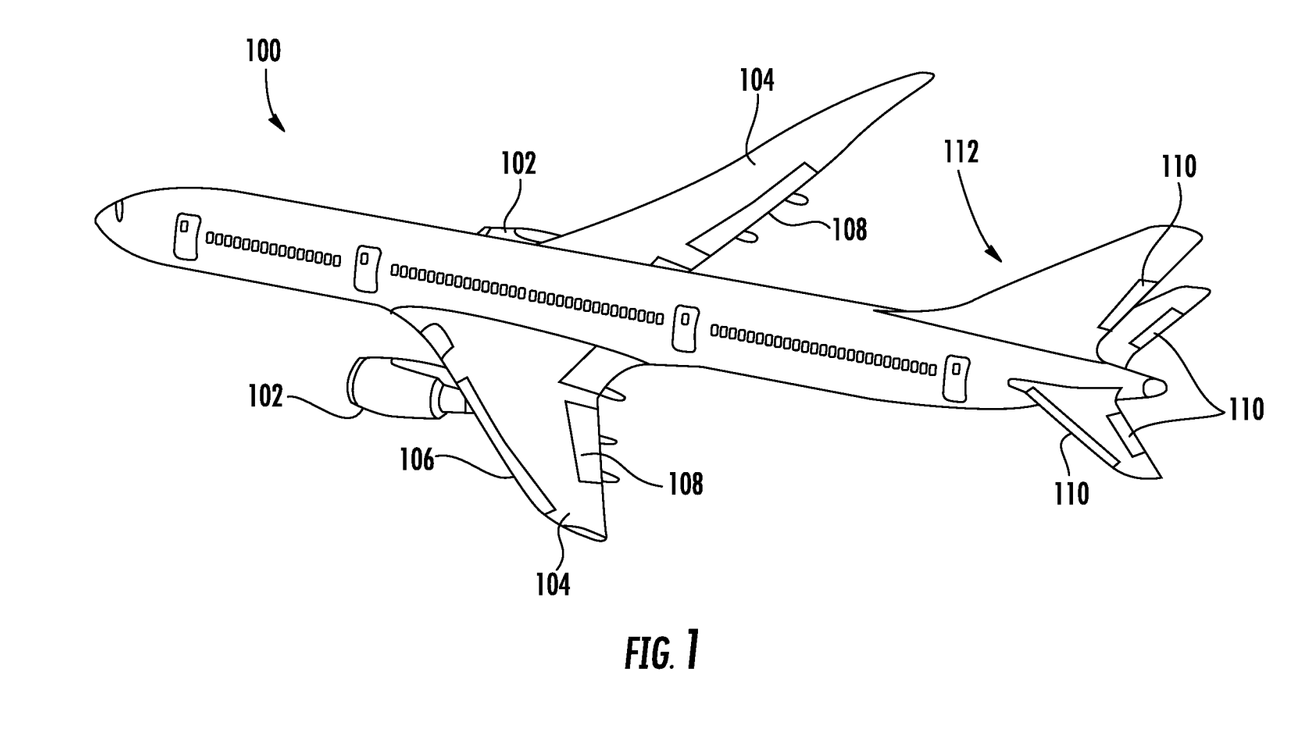
FIG. 1 is a perspective schematic illustration of an aircraft that includes moveable control surfaces.

FIG. 1 illustrates an example of an aircraft 100, illustrated as a commercial aircraft, having aircraft engines 102. The aircraft 100 can embody aspects of the teachings of this disclosure. The aircraft 100, as shown, includes two wings 104 with wing lift systems that each includes one or more aerodynamic control surfaces. As shown, the aerodynamic control surfaces include slats 106 and one or more flaps 108 located on the wings 104. The slats 106 are located on a leading edge of the wings 104 and the flaps 108 are located on a trailing edge of the wings 104. Further, as shown, the aerodynamic control surfaces include slats and/or flaps 110 located on a tail 112 of the aircraft 100. The term "control surface" as used herein can refer to slats, flaps, and/or other controllable surfaces that are operated to enable flight control of the aircraft 100. Although description herein will be discussed with respect to the control surfaces 106, 108 located on the wings 104, those of skill in the art will appreciate that embodiments of the present disclosure can be applied to operation of the control surfaces 110 located on the tail 112 of the aircraft 100. The control surfaces 106, 108, 110 can be driven by one or more actuators that are operably connected to the respective control surfaces 106, 108, 110.

Traditional wing lift systems interconnect all control actuators on both wings of an aircraft with torque tubes and a central power distribution unit (PDU). This system of actuators traditionally relies on external sensors connected directly to the main driveline to track the driveline revolutions which correlate to actuator and wing position. This interconnected system has been replaced on some applications with stand-alone electromechanical actuators (EMA), and thus interconnection is not achieved. Without such interconnection, driveline-based position tracking systems cannot function. Accordingly, it may be advantageous to have position tracking systems that can be employed either interconnected or non-interconnected systems with a high level of accuracy.

Alternatively to driveline revolution tracking in an interconnected system, linear position tracking can be employed due to the nature of magnetized hardware used for EMAs. Magnetic-based sensors, such as Hall Effect sensors, can be placed perpendicularly to an actuator shaft, such as a translating cylinder such that as the cylinder translates linearly. Magnetized stripes on the linear cylinder create an alternating positive-negative signal that can be detected by the Hall Effect sensors and thus the position of the actuator shaft can be measured.

Figure 2:
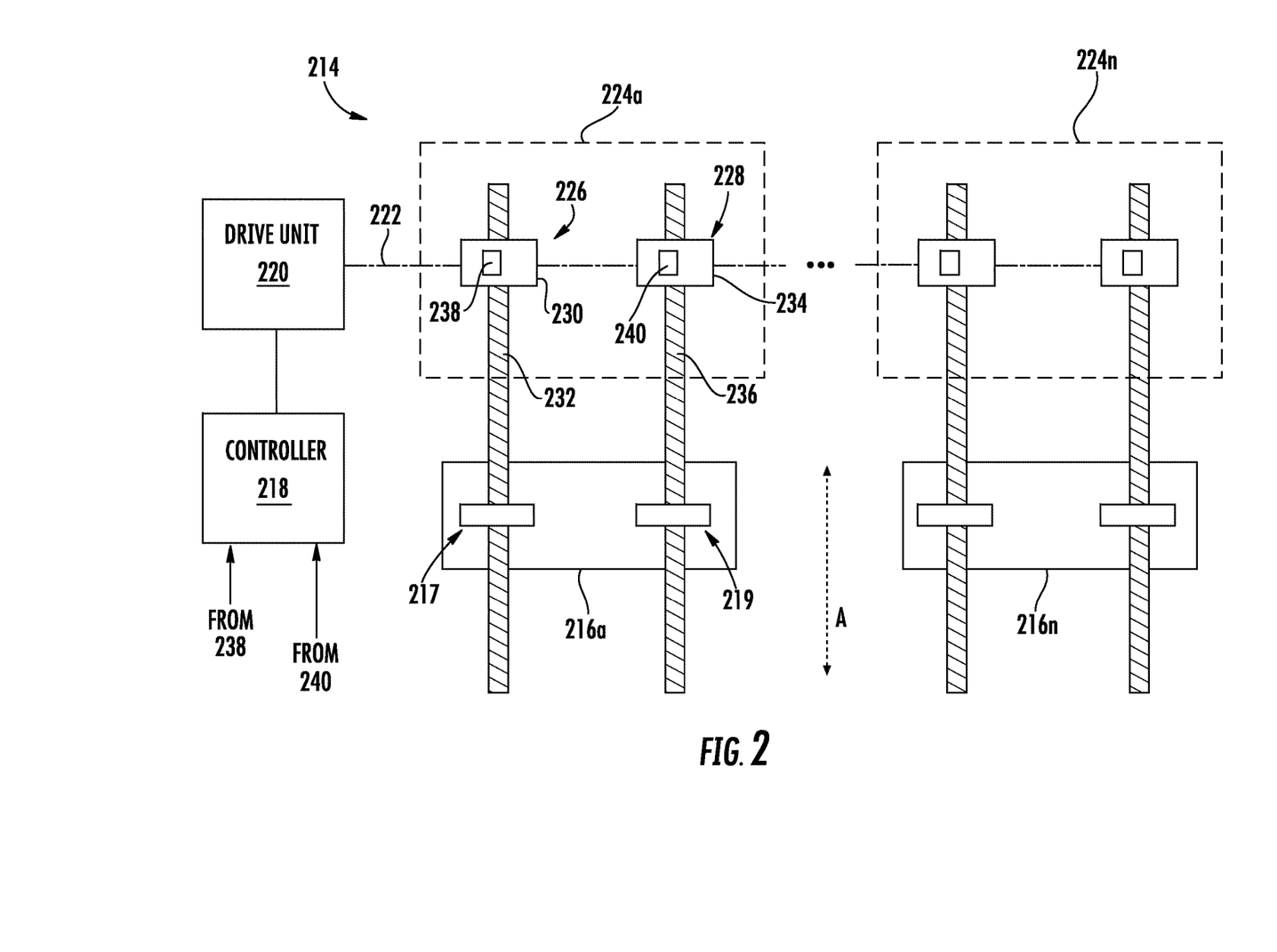
FIG. 2 is schematic illustration of an actuator control system that includes one or more actuators having an internal position sensor disposed therein.

FIG. 2 illustrates, generally, a system 214 that is operable and/or controllable to control and monitor the location of one or more control surfaces of an aircraft (e.g., control surfaces 106, 108, 110). As illustrated in FIG. 2, a plurality of control surfaces 216a . . . 216n are illustrated and controlled by system 214. Those of skill in the art will appreciate that any number of control surfaces can be controlled and monitored by the system 214, although only two control surfaces 216a, 216n are illustrated. The control surfaces 216a, 216n can be flaps and/or slats, such as slats 106 and flaps 108 illustrated in in FIG. 1 and/or control surfaces 110 located on the tail 112 of the aircraft 100.

The system 214 includes a controller 218. The controller 218 is configured to issue control commands to a drive unit 220. The commands can include commands to cause the drive unit 220 to rotate an optional drive shaft 222 in order to move one or more of the control surfaces 216a, 216n in a desired direction or motion. For example, the drive shaft 222 can be rotated to cause one or more of the control surfaces to move in a direction in or out as generally indicated by arrow A. To convert the rotary motion of the drive shaft 222 into linear motion to move the control surfaces 216a, 216n, one or more actuator units 224a . . . 224n are provided, with each control surface 216a . . . 216n having a dedicated and/or respective actuator unit 224a . . . 224n. As shown, the drive shaft 222 is schematically shown as interconnecting the various actuators 226, 228 and the various actuator unit 224a . . . 224n. However, those of skill in the art will appreciate that the various actuators and/or actuator units may be independent and thus not interconnected.

Each actuator unit 224a . . . 224n, as shown, includes two actuators operably connected to the respective control surface 216a . . . 216n. For example, a first actuator unit 224a includes first and second actuators 226, 228. The first actuator 226 includes a first actuator drive unit 230 and a first linear translation element 232. The first actuator drive unit 230 receives rotary motion from the drive shaft 222 and causes the first linear translation element 232 to move linearly in a direction shown generally by arrow A. Similarly, the second actuator 228 includes a second actuator drive unit 234 and a second linear translation element 236. The second actuator drive unit 234 also receives rotary motion from the drive shaft 222 and causes the second linear translation element 236 to move linearly in the direction shown generally by arrow A. The linear translation elements 232, 236 are operably connected to respective portions of the first control surface 216a. Thus, movement of the first linear translation element 232 causes a first portion 217 of the first control surface 216a to move and movement of the second linear translation element 236 causes a second portion 219 of the first control surface 216a to move. The first and second portions 217, 219 of the first control surface 216a may be ends or sides of the control surface and movement thereof adjusts position, angle, tilt, etc. of the control surface 216a to enable flight of an aircraft.

In one non-limiting embodiment, the linear translation elements 232, 236 are ball screws driven by a ball nut as will be appreciated by those of skill in the art. In another non-limiting embodiment, the linear translation elements 232, 236 are hydraulic drive shafts. In another non-limiting embodiment, the linear translation elements 232, 236 are magnetic shafts driven by an electromagnetic stator as will be appreciated by those of skill in the art. In each of the various embodiments and/or configurations, the respective actuator drive unit 234 is appropriately configured, as will be appreciated by those of skill in the art.

Each actuator 230, 234 includes a respective sensor assembly 238, 240 positioned relative thereto, and in some embodiments, contained at least partially therein. The actuators 230, 234 can be EMAs and the linear translation elements 232, 236 are magnetized linear cylinders with alternating magnetization. In such configurations, the sensor assemblies 238, 240 can include magnetic sensors, such as Hall Effect sensors, that measure a linear displacement of the linear translation elements 232, 236, respectively. In other embodiments, the sensors can be optical sensors that detect a property of a respective linear translation element, as described herein.

Figure 3:
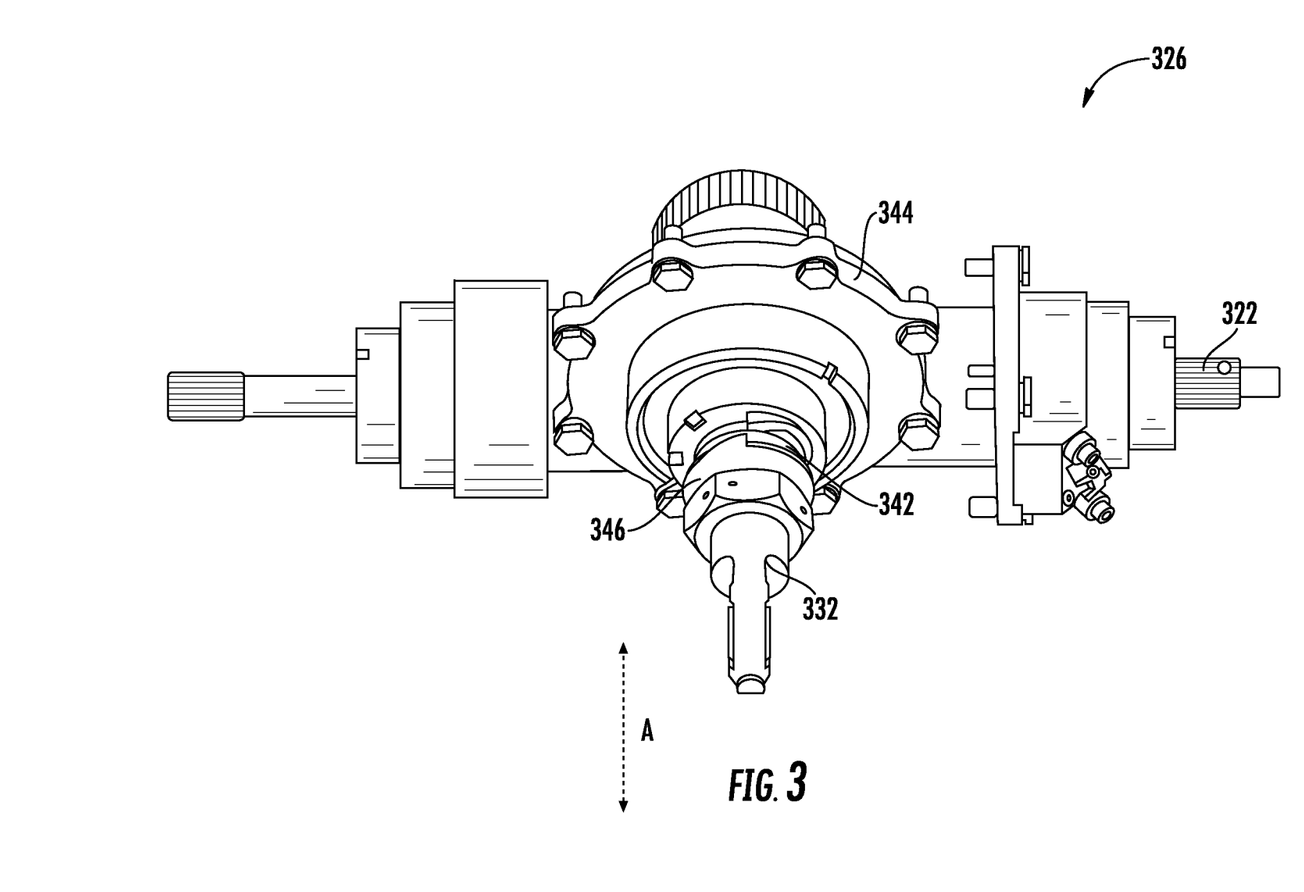
FIG. 3 is a schematic perspective illustration of a simplified example of an actuator according to an embodiment of the present disclosure.
Figure 4:
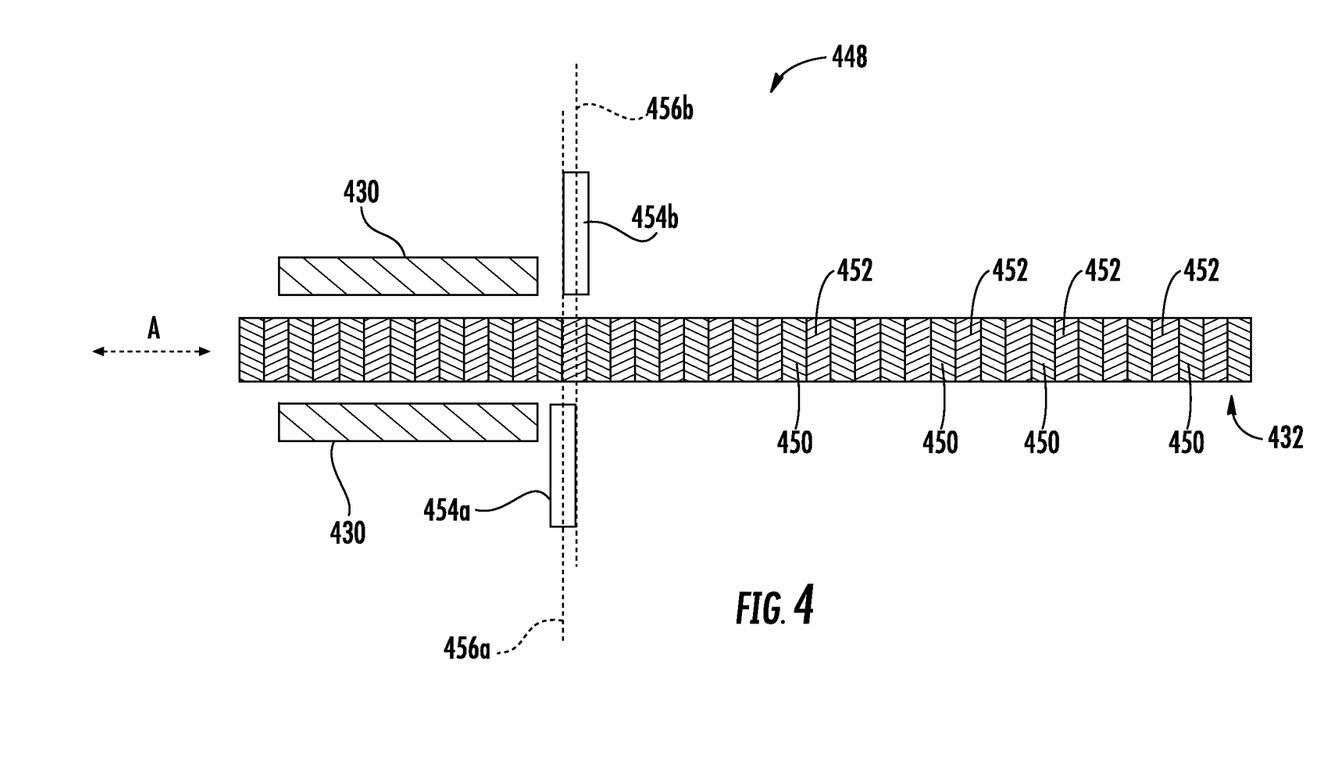
FIG. 4 is a schematic illustration of a sensor assembly of an actuator in accordance with an embodiment of the present disclosure.

FIG. 3 illustrates a simplified version of actuator 326 that may be any actuator shown in FIG. 2 (e.g., actuators 226, 228). The actuator 326, as shown, is operably connected to a drive shaft 322. The drive shaft 322 can be controlled by a controller and drive unit, as described above. Rotation of the drive shaft 322 causes the linear translator 332 to move in the direction shown by arrow A in a known manner. The linear translator 332 is illustrated as being part of a ball screw 342, although other configurations are possible, as noted above. To that end, the actuator 326 can include gears or other mechanical linkages or operable connections 344 to the drive shaft 322. In FIG. 3, such a gear is shown as element 344 and includes an outer ball screw housing 346 that surrounds some or all of the linear translator 332. The skilled artisan shall recognize that the term ball screw includes the outer ball screw housing 346 and the linear translator 332. Although shown as a ball screw configurations, various other configurations, including magnetic arrangements as shown in FIG. 4, can be employed without departing from the scope of the present disclosure.

Referring back now to FIG. 2, it shall be understood that each of the actuators 226, 228 could be the same or similar to that shown in FIG. 3 or FIG. 4, described below, and, as such, the sensor assemblies 238, 240 and/or each actuator 230, 228 can measure the linear translation of the translating elements 232, 236. The output of the sensor assemblies 238, 240, in accordance with some embodiments, is a voltage or other electrical measurement (e.g. current) and can be provided as a signal transmitted to the controller 218, as schematically shown in FIG. 2.

As stated above, the controller 218 issues commands to cause the drive unit 220 to rotate drive shaft 222. The rotation of the drive shaft 222 causes linear motion of the linear translating elements 232, 236. In an EMA configuration, the controller 218 can issue commands to each separate EMA such that they operate in tandem to achieve a desired result (e.g., a desired extension or movement of an aerodynamic control surface).

The amount of translation (e.g., a voltage output measured by the sensor assemblies 238, 240) should be proportion to the amount of rotation of the drive shaft 222 in a properly operating actuator 226, 228. Thus, the controller 218 need only compare the amount of expected sensor output for a given command signal from the drive unit 220 to determine if either of the actuators 226, 228 is not operating properly.

If the outputs of both sensor assemblies 238, 240 fail to match the expected positions based on the actuator inputs then the system 214 (e.g., controller 218) determines that a jam or other actuator malfunction has occurred. If the output of the two sensor assemblies 238, 240 does not match each other, then the controller 218 attributes such mismatch to a skew condition. Additionally, the output of the two sensor assemblies 238, 240 provides positional location information of the respective control surface 216a.

Skew and actuator malfunction can generally be referred to as "error conditions" herein. Embodiments of the present disclosure are directed to determining such error conditions. The error conditions can be determined by comparisons between sensor outputs and an expected output based on what the controller 218 instructs to the drive unit 220. For instance, the controller 218 can instruct the drive unit 220 move the control surface 216a to a fully extended position. Upon receiving such comment, the drive unit 220 can rotate the drive shaft 222 ten rotations, in an interconnected embodiment. In a non-interconnected embodiment, the controller 218 can instruct a plurality of EMAs to extend respective linear translation elements a particular distance (e.g., number of rotations, etc.). The rotations or other actuation movement will cause the respective linear translation element 232, 236 motion that is proportional to the rotation. Such movement of the linear translation elements 232, 236 is measured by the respective sensor assemblies 238, 240. The sensor assemblies 238, 240 will transmit or otherwise communicate a sensor output to the controller 218, whereupon the controller 218 will make one or more comparison calculations (e.g., compared to instructions/commands (e.g., failure), compared to each other (e.g., skew event)). The comparison made by the controller 218 can determine that an actuator jam or other failure exists in one or more actuator units. In such a case, the control unit 218 can generate an alert, alarm, or other notification (referred to herein as an error indication) that can be provided on a screen or other output device to an operator of the aircraft. Similarly, when the sensor outputs received from the sensor assemblies 238, 240 do not match, a control surface 216a skew condition may be determined and an error indication can be generated and provided to an operator of the aircraft.

An embodiment of a sensor assembly 448 is schematically shown in FIG. 4. In some embodiments, the sensor assembly 448 can be part of an actuator unit, and more particularly, particularly part of an actuator (e.g., actuators 226, 228). The sensor assembly 448 includes a linear translation element 432 that is driven by an actuator drive unit 430. In this embodiment, the linear translation element 432 is a magnetic shaft formed from alternating magnetic elements 450, 452. In this configuration, the actuator drive unit 430 is an electromagnetic stator that can be controlled to drive the magnetic linear translation element 432 in the direction shown by arrow A in a known manner. The actuator drive unit 430 can receiving a current which passes through the stator and induces the magnetic linear translation element 432 to move, as will be appreciated by those of skill in the art.

The sensor assembly 448 further includes sensing elements 454a, 454b. As shown, the sensing elements 454a, 454b are offset from each other along an axis of the linear translation element 432 (e.g., in the movement direction A). Such offset, as used herein, will be referred to as an axial offset. As such, a first axis 456a of a first sensing element 454a is axially offset from a second axis 456b of a second sensing element 456b. In the embodiment of FIG. 4, the sensing elements 454a, 454b are Hall Effect sensors or other magnetic field sensors.

In such an embodiment, the discrete nature of alternating positive-negative signals of the alternating magnetic elements 450, 452 of the linear translation element 432 can be detected by a multitude of magnetic sensors to achieve a desired positional accuracy. Thus, the movement and position of the linear translation element 432 can be accurately measured. The sensing elements 454a, 454b are in communication with a controller to provide position and/or movement feedback related to actual movement of the linear translation element 432, which can then be compared to command information, as described above, to determine an operational status. In some embodiments, at least two Hall Effect sensors should be used which are offset along the linear direction of the linear translation element to track directional travel. Although shown and described as having two sensing elements 454a, 454b, additional fidelity may be achieved having additional sensing elements that can be placed at varying spacing to achieve a desired application-specific linear position accuracy.

In operation, as the linear translation element 432 is driven by the actuator drive unit 430, the alternating magnetic elements 450, 452 will be detected by each of the sensing elements 454a, 454b. By monitoring the signals of the two sensing elements 454a, 454b, a direction of motion can be detected (or any motion at all). That is, as the alternating magnetic elements 450, 452 move relative to the sensing elements 454a, 454b, a signal strength will be monitored by a controller, with the signal strength being, in this embodiment, a detected magnetic field strength and polarity.

Figure 5:
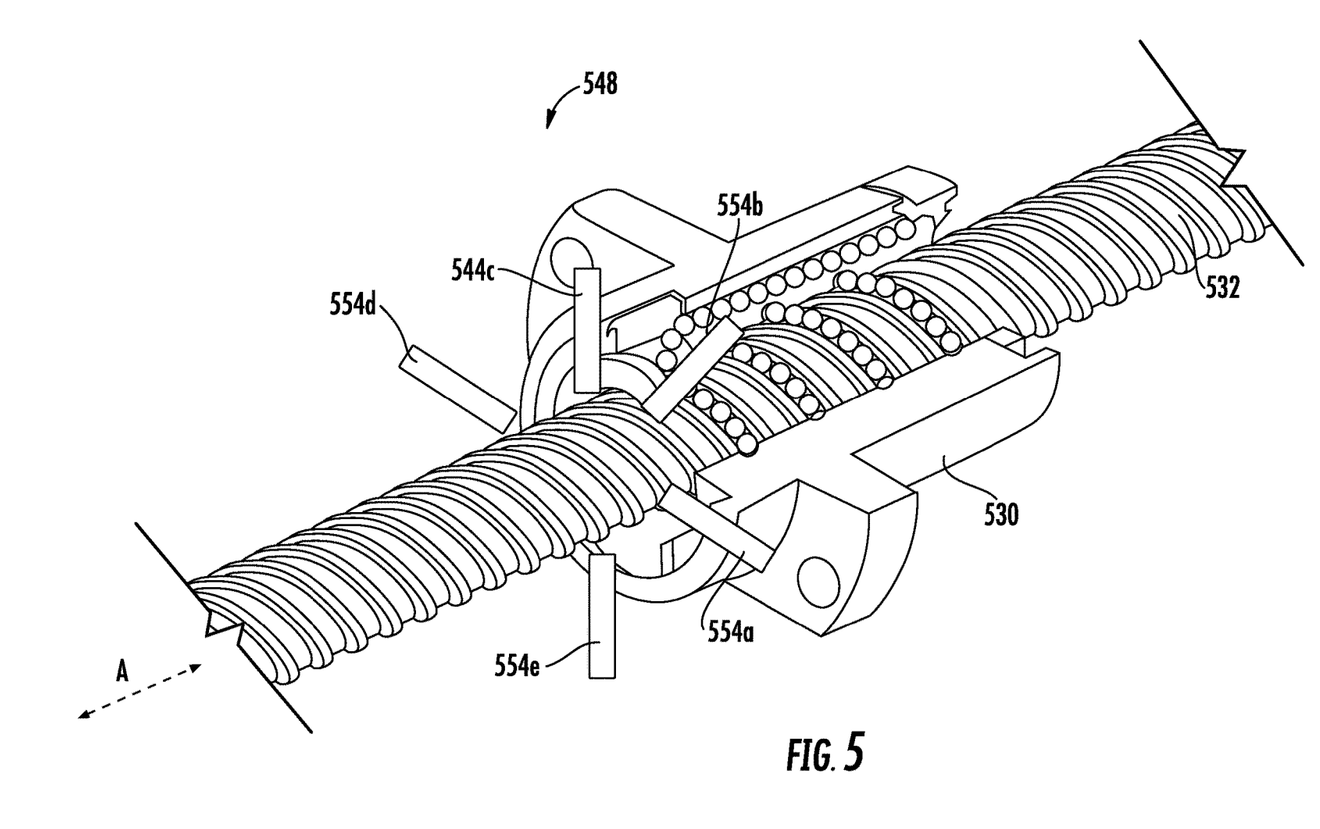
FIG. 5 is a schematic illustration of another sensor assembly of an actuator in accordance with an embodiment of the present disclosure.

Turning to FIG. 5, an alternative configuration of a sensor assembly 548 in accordance with an embodiment of the present disclosure is shown. In the embodiment of FIG. 5, the sensor assembly 548 includes an actuator drive unit 530 that drives a linear translation element 532, which as shown is a ball screw configuration. A plurality of sensing elements 554a . . . 554e are shown positioned relative to the linear translation element 532. Each of the sensing elements 554a . . . 554e can be positioned at the same axial position with respect to a movement direction A of the linear translation element 532. The sensing elements 554a . . . 554e, however, can be offset circumferentially relative to each other (referred to herein as circumferentially offset), such that the threads of the linear translation element 532 detected by the sensing elements 554a . . . 554e can provide movement information. In this embodiment, the sensing elements 554a . . . 554e can be optical sensors (e.g., laser), magnetic sensors (e.g., Hall Effect sensor), acoustic sensors, and/or other type of sensor that can determine a distance between the respective sensing element 554a . . . 554e and a surface of the linear translation element 532. In some embodiments, the threads of the linear translation element can be magnetized, such that the grooves and peaks have different magnetization, and thus a similar embodiment to that described above with respect to FIG. 4 may be employed.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An actuator system for controlling an aerodynamic control surface of an aircraft, the system comprising:
   a first actuator receiving a first actuator input and a first linear translation element that moves based on the first actuator input, the first linear translation element operably connected to a first portion of the aerodynamic control surface to move the first portion of the aerodynamic control surface;
   a first sensor assembly disposed relative to the first actuator that generates a first sensor output based on a displacement of the first linear translation element;
   a second actuator receiving a second actuator input and a second linear translation element that moves based on the second actuator input, the second linear translation element operably connected to a second portion of the aerodynamic control surface to move the second portion of the aerodynamic control surface;
   a second sensor assembly disposed relative to the second actuator that generates a second sensor output based on a displacement of the second linear translation element; and
   a controller that generates the first and second actuator inputs and receives the first and second sensor outputs and determines if an error condition exists for the system based on the first and second sensor outputs
   wherein the first linear translation element is a magnetic shaft formed from alternating magnetic elements that is driven by an electromagnetic stator,
   wherein the first sensor assembly comprises a first magnetic sensor and a second magnetic sensor, wherein the first and second magnetic sensors are positioned relative to the first linear translation element to detect the alternating magnetic elements of the first linear translation element and the first and second magnetic sensors are positioned with an axial offset relative to the first linear translation element.

2. The actuator system of claim 1, wherein the first and second actuators are electromagnetic actuators.

3. The actuator system of claim 1, wherein the aerodynamic control surface is a flap or slat.

4. The actuator system of claim 1, wherein the error condition is a skew condition of the aerodynamic control surface and is determined by the controller when the sensors outputs from the first and second sensor assemblies do not match.

5. The actuator system of claim 1, further comprising a drive unit operably connected to the controller configured to drive a drive shaft that is operably connected to the first and second actuators, the drive unit causing the drive shaft to rotate based on signals received from the controller.

6. The actuator system of claim 1, wherein the error condition is an actuator malfunction and is determined by the controller when at least one of the first actuator input and the second actuator input does not match a respective first or second sensor output.

7. The actuator system of claim 1, wherein the magnetic sensors are Hall Effect sensors.

8. The actuator system of claim 1, wherein the first sensor assembly comprises at least two sensing elements positioned relative to the linear translation element and configured to detect a position or movement of the linear translation element.

9. A method of controlling and monitoring an aerodynamic control surface of an aircraft, the method comprising:
   sending an first actuator input from a controller to a first actuator to drive a movement of a first linear translation element that is operably connected to a first portion of the aerodynamic control surface;
   sending an second actuator input from the controller to a second actuator to drive a movement of a second linear translation element that is operably connected to a second portion of the aerodynamic control surface;
   generating a first sensor output with a first sensor assembly disposed relative to the first actuator, the first sensor output being based an amount of linear motion of the first linear translation element;
   generating a second sensor output with a second sensor assembly disposed relative to the second actuator, the second sensor output being based an amount of linear motion of the second linear translation element;
   comparing expected sensor outputs to the first and second sensor outputs using the controller to determine if an error condition exists; and
   generating an error indication when the error condition exists,
   wherein the first linear translation element is a magnetic shaft formed from alternating magnetic elements that is driven by an electromagnetic stator, the method further comprising detecting variations in magnetic field that correlate to linear motion of the first and second linear translation elements, and
   wherein the first sensor assembly comprises a first magnetic sensor and a second magnetic sensor, wherein the first and second magnetic sensors are at least one of (i) positioned relative to the first linear translation element to detect the alternating magnetic elements of the first linear translation element or (ii) positioned with an axial offset relative to the first linear translation element.

10. The method of claim 9, wherein the first and second actuators are electromagnetic actuators, the method further comprising detecting variations in magnetic field that correlate to linear motion of the first and second linear translation elements.

11. The method of claim 9, wherein the error condition is at least one of (i) a skew condition of the aerodynamic control surface and is determined by the controller when the sensors outputs from the first and second sensor assemblies do not match or (ii) an actuator malfunction and is determined by the controller when at least one of the first actuator input and the second actuator input does not match a respective first or second sensor output.

12. The method of claim 9, further comprising detecting a characteristic of the first and second linear translation elements and correlating the detected characteristics to linear motion of the respective first and second linear translation elements.

13. An actuator system for controlling an aerodynamic control surface of an aircraft, the system comprising:
a first actuator receiving a first actuator input and a first linear translation element that moves based on the first actuator input, the first linear translation element operably connected to a first portion of the aerodynamic control surface to move the first portion of the aerodynamic control surface;
a first sensor assembly disposed relative to the first actuator that generates a first sensor output based on a displacement of the first linear translation element;
a second actuator receiving a second actuator input and a second linear translation element that moves based on the second actuator input, the second linear translation element operably connected to a second portion of the aerodynamic control surface to move the second portion of the aerodynamic control surface;
a second sensor assembly disposed relative to the second actuator that generates a second sensor output based on a displacement of the second linear translation element; and
a controller that generates the first and second actuator inputs and receives the first and second sensor outputs and determines if an error condition exists for the system based on the first and second sensor outputs,
wherein the first linear translation element is a threaded ball screw shaft that is driven by a ball nut, and
wherein the first sensor assembly comprises a first optical sensor and a second optical sensor, wherein the first and second optical sensors are positioned relative to the first linear translation element to detect the threads of the first linear translation element.

14. The actuator system of claim 13, wherein the first and second optical sensors are positioned with a circumferential offset relative to the first linear translation element.

15. The actuator system of claim 13, wherein the aerodynamic control surface is a flap or slat.

16. The actuator system of claim 13, wherein the error condition is a skew condition of the aerodynamic control surface and is determined by the controller when the sensors outputs from the first and second sensor assemblies do not match.

17. The actuator system of claim 13, further comprising a drive unit operably connected to the controller configured to drive a drive shaft that is operably connected to the first and second actuators, the drive unit causing the drive shaft to rotate based on signals received from the controller.

18. The actuator system of claim 13, wherein the error condition is an actuator malfunction and is determined by the controller when at least one of the first actuator input and the second actuator input does not match a respective first or second sensor output.

* * * * *